United States Patent [19]

Ehrmann et al.

[11] Patent Number: 4,886,281
[45] Date of Patent: Dec. 12, 1989

[54] SEALING RING HAVING A SEALING SURFACER WITH A RECESSIONAL ANNULAR PROJECTION

[75] Inventors: Peter Ehrmann, Karlsruhe; Karl-Heinz Spies, Birkenau; Rolf Vogt, Schwetzingen-Oftersheim, all of Fed. Rep. of Germany

[73] Assignee: Firma Carl Freudenberg, Weinheim and der Bergstrasse, Fed. Rep. of Germany

[21] Appl. No.: 172,998

[22] Filed: Mar. 23, 1988

Related U.S. Application Data

[63] Continuation of Ser. No. 922,687, Oct. 24, 1986, abandoned.

[30] Foreign Application Priority Data

Dec. 21, 1985 [DE] Fed. Rep. of Germany ....... 3545683

[51] Int. Cl.$^4$ .............................................. F16J 15/32
[52] U.S. Cl. ...................................... 277/47; 277/35; 277/152; 277/153; 277/270 R; 277/208
[58] Field of Search ................. 277/134, 152, 753, 37, 277/207 R, 207 A, 208, 209, 210, 211, 180, 35, 47

[56] References Cited

U.S. PATENT DOCUMENTS

| | | | |
|---|---|---|---|
| 2,804,325 | 8/1957 | Riesins | 277/153 |
| 3,166,332 | 1/1965 | Olson | 277/209 X |
| 3,195,906 | 7/1965 | Moyers | 277/211 X |
| 3,460,874 | 8/1969 | Johnson | 277/153 X |
| 3,647,229 | 3/1972 | Grimes | 277/207 A |
| 3,727,923 | 4/1973 | McEwen | 277/153 X |
| 3,929,340 | 12/1975 | Peisker | 277/134 |
| 3,930,656 | 1/1976 | Jelinek | 277/211 X |
| 4,018,461 | 4/1977 | Bram | 277/207 A |
| 4,083,567 | 4/1978 | Thumm | 277/37 |
| 4,126,320 | 11/1978 | Pendleton | 277/152 |
| 4,155,560 | 5/1979 | Repella | 277/134 X |
| 4,208,059 | 6/1980 | Fryatt | 277/153 |
| 4,278,261 | 7/1981 | Miura et al. | 277/153 |
| 4,283,063 | 8/1981 | Prescott | 277/37 |
| 4,300,778 | 11/1981 | Gagne | 277/153 |
| 4,427,205 | 1/1984 | Holzer | 277/152 X |
| 4,527,673 | 7/1985 | Szcupak | 277/153 X |
| 4,550,920 | 11/1985 | Matsushima | 277/153 X |
| 4,560,177 | 12/1985 | Riley, Jr. | 277/153 X |

FOREIGN PATENT DOCUMENTS

| | | | |
|---|---|---|---|
| 1945366 | 3/1971 | Fed. Rep. of Germany | 277/152 |
| 876866 | 11/1942 | France | 277/153 |
| 1040930 | 9/1966 | United Kingdom | 277/152 |
| 1057629 | 2/1967 | United Kingdom | 277/152 |

OTHER PUBLICATIONS

"Elastohydrodynamic Sealing Systems" by James D. Symons, *Society of Automotive Engineers*, Detroit, Mich., Jan. 1973.

*Primary Examiner*—Allan N. Shoap
*Attorney, Agent, or Firm*—Felfe & Lynch

[57] ABSTRACT

A sealing ring for sealing about a relatively-movable shaft has a sealing surface and resilient means for resiliently bearing the sealing surface on the shaft. At least one annular projection projects from the sealing surface for contacting the shaft. The annular projection is made recessional into the sealing surface, by making at least the portion of the sealing ring at the sealing surface of a rubber having a Shore A hardness of from about 65 to about 90, in such a way as to leave a portion of the sealing surface in contact with the shaft at an annular surface region spaced axially from the annular projection.

21 Claims, 5 Drawing Sheets

SEALING RING HAVING A SEALING SURFACER WITH A RECESSIONAL ANNULAR PROJECTION

This application is a continuation of application Ser. No, 922,687, filed Oct. 24, 1986, now abandoned.

BACKGROUND OF THE INVENTION

The invention relates to a ring for sealing about a shaft, for example, the ring having, more particularly, a sealing surface for resiliently bearing with surface to surface contact about the shaft, for example, with an annular, recessional projection for recessing into the sealing surface when it so bears on the shaft, for example.

A known sealing ring is made of polymeric material and has an annular sealing surface resiliently urged about a cylindric shaft. The sealing surface has at least one, integral, annular projection molded thereon, for example, which, therefore, coaxially encircles and contacts the shaft in the zone of the sealing surface.

A sealing ring of this type is disclosed in U.S. Pat. No. 2,804,325. It consists of polytetrafluoroethylene, a polymeric material having horn-like, inflexible properties, and has plural, inwardly-directed annular projections about its sealing surface axially separated by deep grooves of a size and contour similar to the annular projections. Only the annular projections therefore contact the surface of a shaft about which the sealing ring is used. The annular projections complement one another in their sealing action, and this makes the sealing ring highly effective, but only so long as the annular projections are new and not worn. However, because only the annular projections contact the shaft, the annular projections are subject to considerable wear upon relative movement, generally rotation, of the sealing ring an shaft. The service life of the sealing ring is, therefore, less than satisfactory.

SUMMARY OF THE INVENTION

An object of the invention is, therefore, to improve a sealing ring of the known type described above in such a way that its service life is extended.

This and other objects are accomplished in accordance with the invention by providing a sealing surface on a sealing ring for resiliently bearing with surface to surface contact on a structure to be sealed, i.e. coaxially about a cylindrical shaft, with an annular projection recessional into the sealing surface. The annular projection is made recessional by making the sealing ring, at least at the sealing surface and, more preferably, the annular projection integrally therewith, of a rubber having a Shore A hardness of from about 65 to about 90. This can and, preferably, does adapt the annular projection for recessing into the sealing surface by the resilience which causes the sealing surface to bear on the shaft with surface to surface contact.

More preferably, the rubber has a Shore A hardness of from about 70 to about 80. This provides an especially-long service life to the sealing ring.

The annular projection of the sealing ring of the invention is, preferably, extremely small. Preferably, it has a height from the sealing surface when not recessed thereinto of only from about 0.04 to about 0.8 mm and, more preferably, of from about 0.05 to about 0.09 mm, with a comparably short width transverse thereto, e.g. axially when the sealing surface is about a cylindric shaft. The normal, resilient bearing pressure of a sealing ring then suffices for recessing the small, annular projection into the soft, elastic rubber of the sealing ring at the sealing surface and for bringing the sealing surface into contact with the surface of the structure, e.g. shaft, to be sealed at a small, transverse, e.g. axial, distance from the annular projection.

Hollow spaces are, therefore, formed at the small, transverse distance between the structure contacts of the annular projection and sealing surface. The hollow spaces coaxially encircle a cylindrical shaft on both axial sides of the annular projection, for example. Under normal operating conditions, the hollow spaces become filled with the medium, e.g. oil, to be sealed, which assures good lubrication of the sealing-surface and annular-projection dynamic-sealing zone upon relative movement, e.g. rotation, of the sealing ring and structure, i.e., the shaft. Significantly reduced wear then occurs in that critical zone which includes the annular projection. In sealing in lubricating oil, for example, too, no deposition of oil carbon has been observed in proximity to the lubricant-pocket hollow spaces so formed coaxially about a shaft rotating fast enough to produce it.

A spring, such as a garter spring about the sealing ring opposite its sealing surface when coaxially about a cylindric shaft, for example, may be employed for resiliently pressing or bearing the sealing surface against the shaft. In that case, the sealing ring may be designed similarly to the one disclosed in German patent publication DAS No. 10 07 130 with the sealing surface and recessional annular projection described above for the invention in place of the sealing lip which bears on the shaft disclosed in the German patent publication at an angle.

The sealing surface may be end-bounded in the direction transverse to the annular, recessional projection, e.g. the axial direction of a sealing surface about a cylindric shaft, by conical surfaces. In this case, the cone angle on the sealing-surface end facing the sealed-in medium should be larger than the cone angle on the opposite sealing-surface end and may range form about 90 to about 120 degrees.

The sealing surface does not have to be long transversely to the annular projection, e.g. axially when about a cylindric shaft. Particularly good results are achieved if the sealing ring has an axially convex profile to a sealing surface that contacts the shaft in proximity to an end of the sealing ring directed toward the sealed-in medium. This curvature may be similar to that of the sealing ring disclosed in U.S. Pat. No. 2,804,325.

The annular projection may transversely taper (continuously or stepwise) from the sealing surface to a narrowed, structure-contacting sealing edge, e.g. V-shaped transverse width as formed between two hourglass-like, preferably-intersecting, coaxially oriented and axially spaced cones. In such a design, the cone surface of the annular projection facing the medium to be sealed should have a larger cone angle than that opposite and, preferably, one of from about 120 to about 130 degrees.

The sealing surface may have more than one recessional annular projection transversely spaced, i.e. axially of the cylindrical shaft they are about, from each other. In that case, the transverse space between annular projections should be coordinated with the dimensions of the annular projections and with the hardness of the rubber of the sealing ring at the sealing surface which makes them recessional so that, under the bearing pressure in operation, the sealing surface, too, contacts the shaft in the space or spaces between the annular projections. Only then is sticking of the sealing-surface dynamic-sealing zone to the shaft reliably prevented and dependable and largely wear-free sealing action obtained over a long period of time, regardless of the direction of relative rotation of a shaft so sealed.

BRIEF DESCRIPTION OF THE DRAWING

Preferred embodiments which illustrate but do not limit the invention will now be described in greater detail with reference to the accompanying drawings, wherein.

DESCRIPTION OF THE PREFERRED EMBODIMENTS

Figure 1:
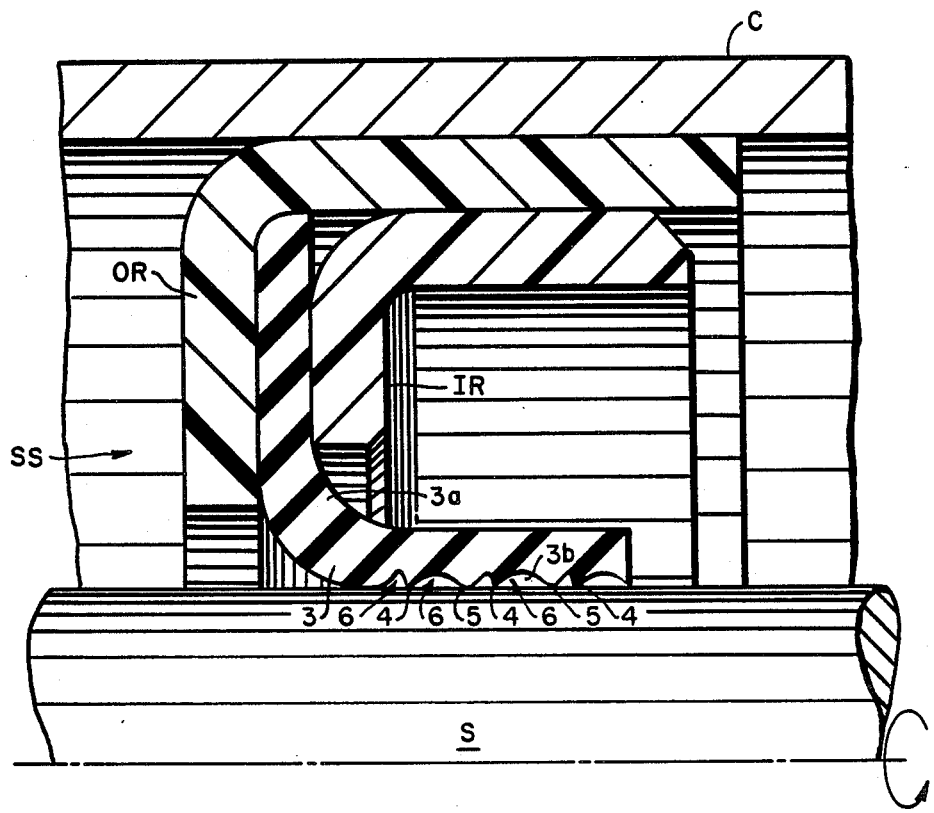
FIG. 1 is half an axial sectional view of one preferred embodiment together with a casing and shaft between which it seals.
Figure 2:
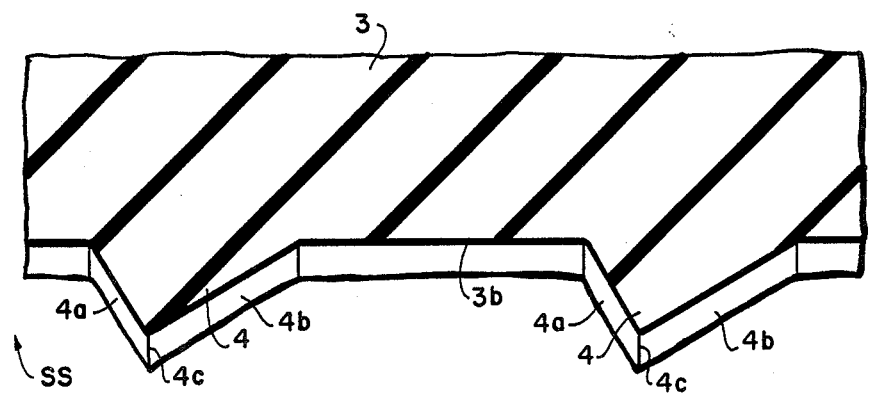
FIG. 2 is an enlarged axial section of a fragment of the preferred embodiment of FIG. 1.
Figure 3:
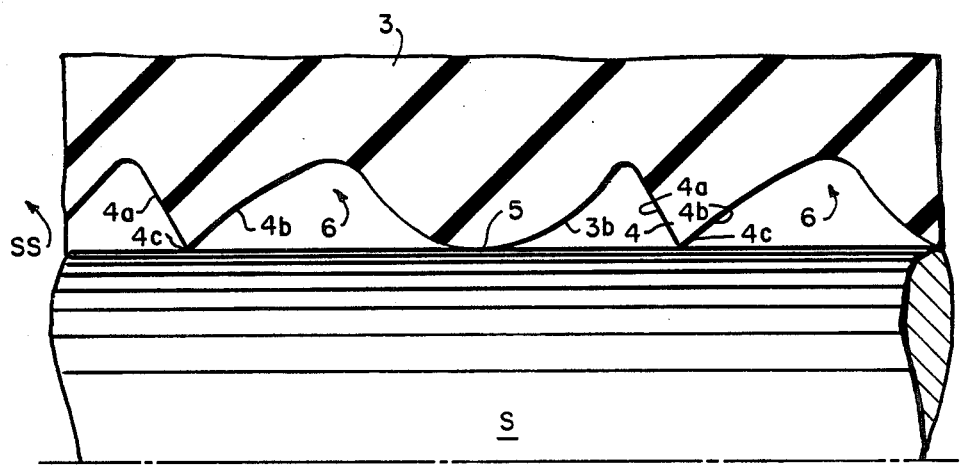
FIG. 3 is an enlarged axial section of the fragment shown in FIG. 2 together with a shaft about which it seals.

FIGS. 1 to 3 show a sealing ring 3 for sealing a casing C about a cylindric shaft structure S which rotates relative thereto. For this, an L-section, outer ring OR sealingly and non-rotatably engages the casing C so that one leg of its L-section is radial of the cylindric shaft S. A correspondingly-shaped inner ring IR is correspondingly in the outer ring and sealingly clamps the outer end 3a of the sealing ring 3 radially between the radial legs of the inner and outer rings.

The sealing ring 3 is made of a rubber having a Shore A hardness of 75. Its internal diameter is such, relative to its thickness, that the other, inner end of the sealing ring flexingly curves to bear resiliently on the shaft with a sealing surface 3b on one side of the inner end of the sealing ring, i.e. substantially coaxially. The flexural curve of the sealing ring from the inner end with the sealing surface 3b is directed toward a liquid-containing sealed space at SS.

The sealing surface 3b which resiliently bears on the surface of the cylindric shaft to be sealed has integral, rubber annular projections 4 axially spaced therealong. The annular projections therefore coaxially encircle the shaft, too.

When not recessed into the sealing surface 3b by its resilient bearing pressure on the shaft as shown in FIG. 2, the annular projections 4 have a height (downward in FIG. 2) from the sealing surface 3b of 0.06 mm. Each annular projection 4 is then bounded on both sides in the axial direction by surfaces 4a, 4b which intersect at an innermost sealing edge 4c of the annular projection, the cone angle of the cone surface 4b directed toward the outside air being about 58 degrees, and the cone angle of the cone surface 4a directed toward the sealed space SS being about 122 degrees. The resultant, total transverse or axial width of each annular projection 4 at the sealing surface 3b is, therefore, about 0.14 mm.

The sealing edges 4c of axially adjacent annular projections 4 are transversely or axially spaced about 0.4 mm. The enlargement of FIG. 3 serves to elucidate the elastic deformation of the sealing surface 3b which results with recession of the annular projections 4 thereinto from the cone angles of the cone surfaces of the annular projections and the resilient bearing pressure of the sealing surface toward the shaft S upon installation of the sealing ring 3 about the shaft. Under the resilient bearing pressure, which is necessary for the operation of the sealing ring, a portion 5 of the sealing surface 3b situated transversely or axially between the annular projections 4, but closer to cone surface 4a than cone surface 4b, also makes contact with the surface of the shaft S sealed about. The deformation shown is, however, not precisely to scale. A transverse or axial sequence of coaxial, annular grooves or hollow spaces at 6 results. The differing profiles and microscopic size S of the hollow spaces provides such favorable sealing-service properties that the shaft-sealing ring can be used in demanding applications.

Figure 4:
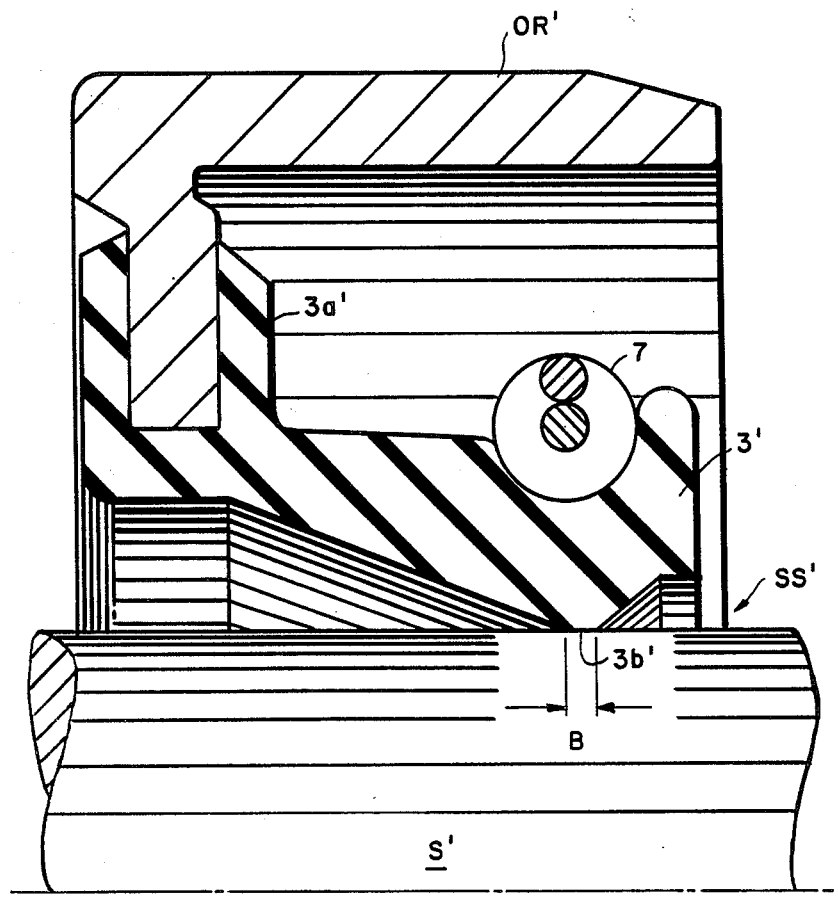
FIG. 4 is half an axial section of another preferred embodiment together with a casing and a shaft between which it seals.

FIG. 4 illustrates another embodiment with an overall, outer form based on that disclosed in German patent publication DAS No. 10 07 130. Like the design known from the publication, it has a rubber sealing ring 3' which is adhesively secured by vulcanization to a metal outer ring OR. However, in contrast to the known design, the sealing ring 3' is not provided with a sealing lip which resiliently bears angularly on a shaft, but with a sealing surface 3b' which resiliently bears coaxially about a cylindric shaft S' in accordance with the invention.

Also, in contrast to the embodiment of FIGS. 1 to 3, a garter spring 7 resiliently presses about the sealing ring for its sealing surface 3b' to bear against the shaft. For this, the garter spring is a metallic coil about the outer periphery of the sealing ring 3' opposite the sealing surface 3b'. It causes the annular projection (4' in FIG. 5) which, prior to installation of the sealing ring about the shaft as shown in FIG. 4, extended inwardly in the radial direction from the sealing surface 3b' to be recessed into the sealing surface.

As shown in FIG. 4 by its transverse or axial width dimension B, the sealing surface 3b' can be small in relation to the dimensions of the sealing ring 3'. As a result, the annular projection (4' in FIG. 5) about the sealing surface 3b' does not show in the ring-overall scale of FIG. 4.

Figure 5:
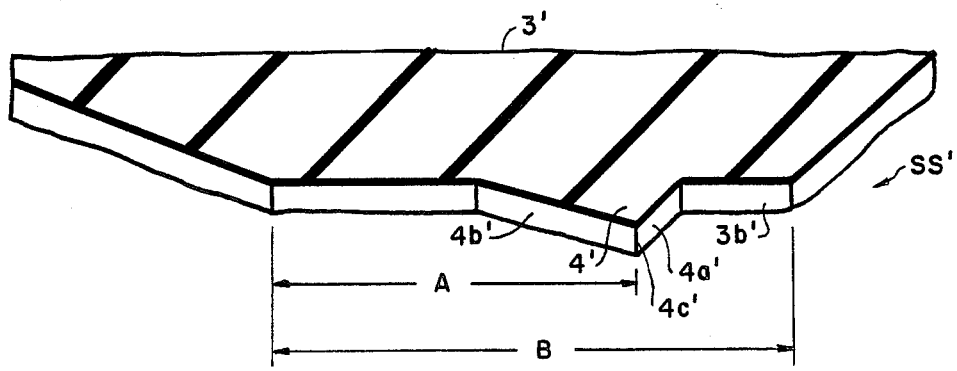
FIG. 5 is an enlarged axial section of a fragment of the embodiment of FIG. 4.

The enlargement of FIG. 5, together with the absence of the resilient bearing pressure against the shaft S' (in FIG. 4), therefore, shows the recessional annular projection 4' on the sealing surface 3b'. The precise transverse or axial width B of the sealing surface is determined by the hardness of the rubber, the pressure from the sealed space SS', and the force of the garter spring 7 (in FIG. 4). However, the transverse or axial width B ranges from about 0.2 to about 1.5 mm and, preferably, from about 0.25 to about 1 mm. The distance A (FIG. 5) should be about two-thirds the transverse axial width B of the sealing surface 3b'.

Figure 6:
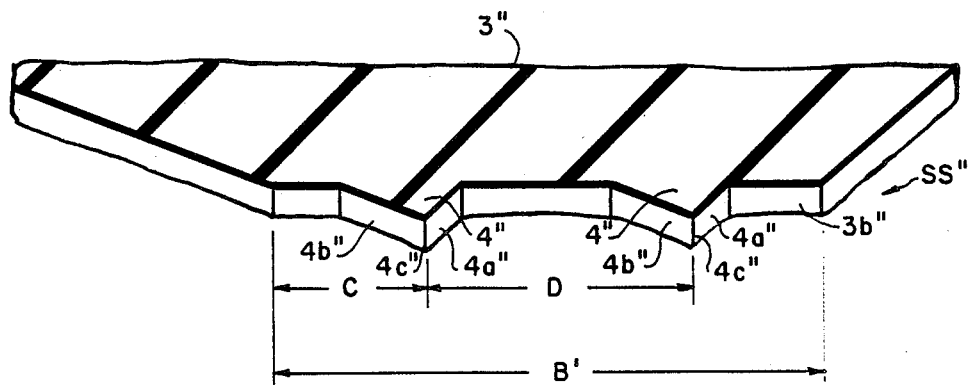
FIG. 6 is an enlarged axial section of a fragment of another preferred embodiment which is similar to that of FIGS. 4 and 5.

The fragment of the sealing ring 3" shown in FIG. 6 is the same as that of FIGS. 4 and 5, except that its sealing surface 3b" of corresponding transverse or axial width B' has two annular projections 4". For these, the distance C is about one-fourth, and the distance D, about one-half the transverse or axial width B' of the sealing surface 3b''.

In the embodiment of FIGS. 4 and 5 and the embodiment of FIG. 6, respectively, the cone angle of the cone surfaces 4a', 4a'' of the annular projections 4', 4'' directed toward the sealed spaces SS', SS'' is about 2.5 times as large as the cone angle of the cone surfaces 4b', 4b'' on the other side of the annular projections, directed toward the outside air, for example. The cone angle of the cone surfaces 4a', 4a'' is approximately 100 degrees.

The annular projections 4', 4'' each have a radial height (downward in FIGS. 5 and 6) from the sealing surfaces 3b', 3b'' to their sealing edges 4c', 4c'' in the unrecessed states of FIGS. 5 and 6 of about 0.06 mm. The rubber-elastic material forming each of the sealing rings 3', 3'' has a Shore A hardness of about 80.

Figure 7:
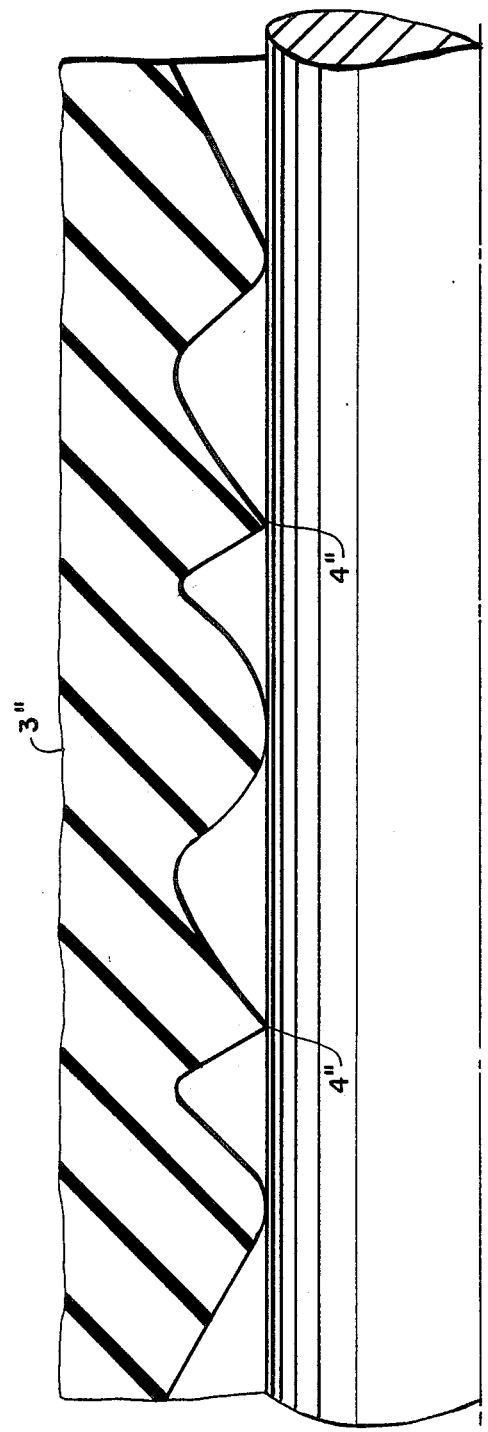
FIG. 7 is an axial section of the embodiment of FIG. 6 together with the shaft about which it seals.

FIG. 7 shows generally how the sealing ring 3'' of FIG. 6 deforms when mounted in a shaft.

The sealing ring 3' of FIG. 5 deforms in the manner shown in either the right or left half of FIG. 7.

It will be appreciated that the instant specification and claims are set forth by way of illustration and not of limitation, and that various changes and modifications may be made without departing from the spirit and scope of the present invention.

What is claimed is:

1. In a ring seal for sealing about a relatively-rotatable shaft having a substantially cylindrical, rotatable contact surface to be sealed, said ring comprising:
   (a) a rigid holding ring adapted to be mounted around, and substantially coaxially with, the shaft;
   (b) a resilient sealing ring supported by said holding ring, said sealing ring having a substantially cylindrical resilient sealing surface adapted to be held substantially coaxially with the shaft, having means for resiliently bearing said sealing surface with surface-to-surface contact against the contact surface of the shaft, and having at least one annular projection extending radially inwardly from said sealing surface for contacting the contact surface of the shaft, said sealing ring being in a compressed state between said holding ring and the shaft when said holding ring and sealing ring are mounted around the shaft, and in a non-compressed state when said holding ring and sealing ring are unmounted;
   the improvement wherein said at least one projection has a height from said sealing surface, when said sealing ring is in said non-compressed state from about 0.04 to about 0.8 mm; and
   wherein at least a portion of said sealing ring at said sealing surface is made of a rubber material with a Shore A hardness in the range of about 65 to 90, thereby making said at least one projection recessional into said sealing surface, when said holding ring and said sealing ring are mounted around the shaft, in such a way as to leave an annular portion of said sealing surface in contact with the shaft at an annular surface region spaced axially from the respective projection and leaving an annular pocket between said annular portion in contact with the shaft and said respective projection for the entrapment of lubricant during operation when said shaft is rotating.

2. The ring seal of claim 1, wherein the rubber portion of the sealing ring at the sealing surface comprises the sealing surface and the annular projection is integral with the sealing surface.

3. The ring seal of claim 2, wherein the rubber has a Shore A hardness of from about 70 to about 80.

4. The ring seal of claim 3, wherein the annular projection transversely tapers from the sealing surface to a narrowed, structure-contacting sealing edge when said sealing ring is in said noncompressed state.

5. The ring seal of claim 4, wherein the transverse taper is formed by intersecting cone surfaces of two coaxially oriented cones.

6. The ring seal of claim 5, and further comprising another of the at least one annular projection transversely spaced from the at least one annular projection.

7. The ring seal of claim 4, and further comprising another of the at least one annular projection transversely spaced from the at least one annular projection.

8. The ring seal of claim 2, wherein the annular projection transversely tapers from the sealing surface to a narrowed, structure-contacting sealing edge when said sealing ring is in said noncompressed state.

9. The ring seal of claim 8, wherein the transverse taper is formed by intersecting cone surfaces of two coaxially oriented cones.

10. The ring seal of claim 8, and further comprising another of the at least one annular projection transversely spaced from the at least one annular projection.

11. The ring seal of claim 2, and further comprising another of the at least one annular projection transversely spaced from the at least one annular projection.

12. The ring seal of claim 1, wherein the rubber has a Shore A hardness of from about 70 to about 80.

13. The ring seal of claim 12, wherein the annular projection transversely tapers from the sealing surface to a narrowed, structure-contacting sealing edge when said sealing ring is in said noncompressed state.

14. The ring seal of claim 13, wherein the transverse taper is formed by intersecting cone surfaces of two coaxially oriented cones.

15. The ring seal of claim 13, and further comprising another of the at least one annular projection transversely spaced from the at least one annular projection.

16. The ring seal of claim 12, and further comprising another of the at least one annular projection transversely spaced from the at least one annular projection.

17. The ring seal of claim 1, wherein the annular projection transversely tapers from the sealing surface to a narrowed, structure-contacting sealing edge when said sealing ring is in said noncompressed state.

18. The ring seal of claim 17, wherein the transverse taper is formed by intersecting cone surfaces of two coaxially oriented cones.

19. The ring seal of claim 17, and further comprising another of the at least one annular projection transversely spaced from the at least one annular projection.

20. The ring seal of claim 1, and further comprising another of the at least one annular projection transversely spaced from the at least one annular projection.

21. The sealing ring of claim 1, wherein said at least one projection has a height from said sealing surface, when said sealing ring is in said non-compressed state, from about 0.05 to about 0.09 mm.

* * * * *